US009786095B2

(12) United States Patent
Park et al.

(10) Patent No.: US 9,786,095 B2
(45) Date of Patent: Oct. 10, 2017

(54) SHADOW RENDERING APPARATUS AND CONTROL METHOD THEREOF

(71) Applicant: SAMSUNG ELECTRONICS CO., LTD., Suwon-si (KR)

(72) Inventors: Jong-pil Park, Yongin-si (KR); Jang-won Lee, Suwon-si (KR); Chan-min Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/053,387

(22) Filed: Feb. 25, 2016

(65) Prior Publication Data

US 2016/0247314 A1   Aug. 25, 2016

Related U.S. Application Data

(60) Provisional application No. 62/120,550, filed on Feb. 25, 2015.

(30) Foreign Application Priority Data

Feb. 5, 2016   (KR) .......................... 10-2016-0015059

(51) Int. Cl.
  *G06T 15/00*   (2011.01)
  *G06T 15/60*   (2006.01)
  *G06T 15/80*   (2011.01)
  *G06T 15/55*   (2011.01)

(52) U.S. Cl.
  CPC ............ *G06T 15/60* (2013.01); *G06T 15/005* (2013.01); *G06T 15/55* (2013.01); *G06T 15/80* (2013.01)

(58) Field of Classification Search
  CPC ....... G06T 15/60; G06T 15/55; G06T 15/005; G06T 15/80
  USPC ......................................................... 345/426
  See application file for complete search history.

(56) References Cited

U.S. PATENT DOCUMENTS

| 5,745,636 | A | 4/1998 | Shashua et al. |
| 6,384,822 | B1 | 5/2002 | Bilodeau et al. |
| 6,593,923 | B1 | 7/2003 | Donovan et al. |
| 6,677,946 | B1 | 1/2004 | Ohba |
| 8,379,021 | B1 * | 2/2013 | Miller ..................... G06T 15/60 |
| | | | 345/426 |
| 8,462,156 | B1 | 6/2013 | Fernando |
| 2009/0309877 | A1 | 12/2009 | Snyder et al. |

(Continued)

FOREIGN PATENT DOCUMENTS

| FR | 2 988 891 A1 | 10/2013 |
| JP | 2001-052208 A | 2/2001 |

(Continued)

OTHER PUBLICATIONS

Goesele, M., et al. "Fast Accurate Soft Shadows with Adaptive Light Source Sampling." (2012), pp. 1-8.*

(Continued)

*Primary Examiner* — Phu K Nguyen
(74) *Attorney, Agent, or Firm* — Sughrue Mion, PLLC (57) ABSTRACT

A shadow rendering method is provided. The shadow rendering method includes emitting radial light to an object so that a shadow area for the object generated by a three-dimensional modeling is projected; determining a portion of the shadow area as a penumbra area for the object; and rendering a penumbra for the object to the penumbra area.

13 Claims, 6 Drawing Sheets

(56) References Cited

U.S. PATENT DOCUMENTS

2012/0218395 A1    8/2012   Andersen et al.
2015/0042655 A1    2/2015   Gautron et al.

FOREIGN PATENT DOCUMENTS

JP      2013-037650 A    2/2013
KR   10-2001-0113730 A    12/2001

OTHER PUBLICATIONS

Communication dated Jul. 19, 2016, issued by the European Patent Office in counterpart European Application No. 16157480.1.

\* cited by examiner

SHADOW RENDERING APPARATUS AND CONTROL METHOD THEREOF

CROSS-REFERENCE TO RELATED APPLICATIONS

This application claims benefit of priority from U.S. Provisional Patent Application No. 62/120,550 filed on Feb. 25, 2015, in the USPTO and claims priority from Korean Patent Application No. 10-2016-0015059 filed on Feb. 5, 2016, in the Korean Intellectual Property Office, the disclosures of which are herein incorporated by reference in their entireties.

BACKGROUND

Field

Apparatuses and methods consistent with the present disclosure relate to a shadow rendering apparatus and a control method thereof, and more particularly, to a shadow rendering apparatus that renders a shadow for a three-dimensional object, and a control method thereof.

Description of the Related Art

A shadow represented by an object generated by a three-dimensional modeling allows a screen to be substantially visualized and a relative relationship between objects to be detected. In a real time rendering, a method for generating a shadow using a shadow mapping is mainly used. In such method, after a shadow map is generated by rendering a z-buffer at a viewpoint of a light source, a shielding from the light source is determined by an additional depth test in a later shading process and brightness of the shading process is determined from a screen to be rendered.

Since the shadow map is simply generated and the determining of whether or not pixels of the screen have the shadow is not affected by scene complexity, the shadow mapping method is efficient, and since it is possible to perform acceleration using hardware, the shadow mapping method is frequently used in real time rendering. However, in the case in which one pixel occupies areas of several pixels at the viewpoint of the light source, the shadow mapping method has a disadvantage that aliasing of a lattice shape occurs at a shadow interface.

In the related art, in order to address the above-mentioned disadvantage, a percentage closer filtering (PCF) method in which an edge area of the shadow is softly modified by collectively filtering an edge portion of the shadow, a percentage closer soft shadow (PCSS) method in which a shadow area is calculated by generating a plurality of virtual rays in the shadow area, and the like were used. However, the PCF method has disadvantages that since the edge area is filtered in a uniform size, it is impossible to approximate a spreading effect of the shadow, and an additional amount of computation for filtering the edge area is required. In addition, in the PCSS method, since a blind degree should be calculated by sampling the virtual rays to calculate the blind degree of the shadow on all surfaces, there is a disadvantage that a large amount of computation is required for a shadow rendering every frame.

SUMMARY

Exemplary embodiments of the present disclosure address the above disadvantages and other disadvantages not described above. Also, exemplary embodiments of the present disclosure are not required to overcome the disadvantages described above, and an exemplary embodiment of the present disclosure may not overcome any of the disadvantages described above.

It is an aspect to provide a shadow rendering apparatus capable of rendering a soft shadow effect in real time while reducing an amount of computation for a shadow rendering, and a control method thereof.

According to an aspect of the present disclosure, a shadow rendering method comprising emitting radial light to an object so that a shadow area for the object generated by a three-dimensional modeling is projected; determining a portion of the shadow area as a penumbra area for the object; and rendering a penumbra for the object to the penumbra area.

The shadow area may be an area in which the radial light is blocked by the object and does not arrive at the shadow area.

The determining of the portion of the shadow area as the penumbra area for the object may comprise calculating first depth information for the object in relation to a first light source that emits the radial light, and determining the penumbra area for the object based on a first depth map generated according to the first depth information.

The determining of the portion of the shadow area as the penumbra area for the object may comprise calculating second depth information for the object in relation to a second light source that emits non-radial light, determining an umbra area for the object based on a second depth map generated according to the second depth information, and determining a remaining area except for the umbra area among the shadow area as the penumbra area.

The rendering of the penumbra for the object to the penumbra area may comprise determining a shading value of the penumbra area based on a depth value difference between the first depth map for the determined penumbra area and the second depth map, and rendering the penumbra for the object to the penumbra area according to the determined shading value.

The rendering of the penumbra for the object to the penumbra area may comprise generating a shadow object by converting the object into a gray scale, and rendering the penumbra for the object by synthesizing the shadow object in a unit of shadow object in the shadow area.

The rendering of the penumbra for the object to the penumbra area may comprise rendering the penumbra for the object by synthesizing the shadow object in the shadow area while sequentially moving the shadow object by an interval in the unit of shadow object.

According to another aspect of an exemplary embodiment, there is provided a shadow rendering apparatus comprising a light generator configured to emit radial light to an object so that a shadow area for the object generated by a three-dimensional modeling is projected; a penumbra area determiner configured to determine a portion of the shadow area as a penumbra area for the object; and a renderer configured to render a penumbra for the object to the penumbra area.

The shadow area may be an area in which the radial light is blocked by the object and does not arrive at the shadow area.

The penumbra area determiner may calculate first depth information for the object in relation to a first light source that emits the radial light, and determine the penumbra area for the object based on a first depth map generated according to the first depth information.

The penumbra area determiner may calculate second depth information for the object in relation to a second light source that emits non-radial light, determine an umbra area for the object based on a second depth map generated according to the second depth information, and determine a remaining area except for the umbra area among the shadow area as the penumbra area.

The renderer may determine a shading value of the penumbra area based on a depth value difference between the first depth map for the determined penumbra area and the second depth map, and render the penumbra for the object to the penumbra area according to the determined shading value.

The renderer may generate a shadow object by converting the object into a gray scale, and render the penumbra for the object by synthesizing the shadow object in a unit of shadow object in the shadow area.

The renderer may render the penumbra for the object by synthesizing the shadow object in the shadow area while sequentially moving the shadow object by an interval in the unit of shadow object.

According to another aspect of an exemplary embodiment, there is provided a shadow rendering apparatus comprising a light generator comprising a first light source configured to emit radial light to an object, and a second light source configured to emit non-radial light to the object; a penumbra area determiner configured to calculate first depth information for the object based on the radial light emitted from the first light source and second depth information for the object based on the non-radial light emitted from the second light source, and to determine first and second depth maps from the calculated first and second depth information, respectively, and to determine a penumbra area based on the first and second depth maps; and a renderer configured to render a penumbra for the object to the penumbra area.

The penumbra area determiner may be further configured to determine an umbra area for the object based on the second depth map, and to determine the penumbra area for the object based on the first depth map and a remaining area except for the umbra area.

The renderer may determine a shading value of the penumbra area based on a depth value difference between the first depth map for the determined penumbra area and the second depth map, and render the penumbra for the object to the penumbra area according to the determined shading value.

The renderer may generate a shadow object by converting the object into a gray scale, and render the penumbra for the object by synthesizing the shadow object in a unit of shadow object in the shadow area.

The renderer may render the penumbra for the object by synthesizing the shadow object in the shadow area while sequentially moving the shadow object by an interval in the unit of shadow object.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Before specifically describing the present disclosure, a method for demonstrating the present specification and drawings will be described.

First, as terms used in the present specification and claims, general terms have been selected by considering functions in diverse exemplary embodiments. However, such terms may be varied depending on an intention of those skilled in the art, a legal or technical interpretation, an emergence of a new technology, and the like. Further, some terms may be terms which are arbitrarily selected by an applicant. Such terms may be construed according to meanings defined in the present specification, and may also be construed based on general contents of the present specification and a typical technical concept in the art unless the terms are not specifically defined.

Further, the same reference numerals or symbols described in the accompanying drawings of the present specification denote parts or components that perform substantially the same function. For convenience of explanation and understanding, the description will be provided using the same reference numerals or symbols in different exemplary embodiments. That is, although a plurality of drawings illustrate the components having the same reference numeral, the plurality of drawings do not mean one exemplary embodiment.

In addition, in order to distinguish between the components, terms including an ordinal number such as "first", "second", etc. may be used in the present specification and claims. The ordinal number is used to distinguish the same or similar components from each other, and the meaning of the terms should not be construed as being limited due to the usage of the above-mentioned ordinal number. As an example, the components coupled to the ordinal number should not be construed as a use order, a layout order, or the like being limited by the number. The respective ordinal numbers are interchangeably used, if necessary.

In the present specification, the singular expression includes the plural expression unless the context clearly indicates otherwise. In the present application, the terms "include" and "consist of" designate the presence of features, numbers, steps, operations, components, elements, or a combination thereof that are written in the specification, should be understood that they do not exclude the presence or possibility of addition of one or more other features, numbers, steps, operations, components, elements, or a combination thereof.

A term "module", "unit", "part", or the like, in the exemplary embodiment of the present disclosure is a term for referring to the component performing at least one function or operation, and such component may also be implemented in hardware or software or a combination of hardware and software. In addition, a plurality of "modules", "units", "parts", or the like may be integrated into at least one module or chip and may be implemented in at least one processor (not illustrated), except for a case in which they need to be each implemented in individual specific hardware.

In addition, in the exemplary embodiment of the present disclosure, it will be understood that when an element is referred to as being "connected to" another element, it can be directly "connected to" the other element or other elements intervening therebetween may be present. In addition, unless explicitly described otherwise, "comprising" any components will be understood to imply the inclusion of other components rather than the exclusion of any other components.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

According to the a related art shadow mapping method, when a shadow is rendered using a shadow map in which depth information of an object in a direction of a light source is stored in a map form, it is determined whether or not the shadow exists by comparing a depth value of one point of the object corresponding to each pixel with a value stored in the depth map. If a depth value stored in the shadow map for a point is smaller than a depth value which is currently measured at the point, it may be determined that the point is positioned in a shadow area, which is an area in which the light source is blocked by the object. In addition, if the depth value stored in the shadow map for the point is equal to the depth value which is currently measured at the point, it may be determined that the point is positioned in an area in which the light source is not blocked by the object and arrives, that is, out of the shadow area.

However, according to the related art shadow mapping method, in the case in which a shadow map pixel is drawn at a point which is close to a viewpoint, there is a disadvantage that aliasing occurs due to an expansion of the shadow map pixel, and there is a disadvantage that a shadow map of higher resolution than that needed to remove the aliasing is required. In addition, there was a disadvantage that it is impossible to generate a penumbra for the object using a general shadow mapping method.

To address these disadvantages, a percentage closer filtering (PCF) method in which an edge area of the shadow is softly modified by collectively filtering an edge portion of the shadow has been used in the related art. However, the PCF method has disadvantages that since it does not calculate how close the object is to the shadow, it is impossible to accurately approximate a spreading effect of the shadow by a surface light source, and an additional amount of computation for filtering the edge area is required. As another method, a percentage closer soft shadow (PCSS) method exists.

The related art PCSS method is a method for representing a more substantial shadow by determining an umbra area by a shadow mapping and generating virtual rays in a penumbra area to calculate a shadow area. According to the related art PCSS method, in order to detect a position and a blind degree of the shadow area, the virtual rays from the respective points on a virtual plane to a light source are generated, and a block test is performed as many as the generated virtual rays. Specifically, according to the PCSS method, a plurality of virtual rays sampled (for example, 30 to 100 virtual rays) are generated, and the block test is performed in which it is calculated which ray is blocked by the object and which ray arrives at the light source, thereby making it possible to calculate the area in which the penumbra is generated. When block test values are summed, the shadow may be represented by calculating the shadow area and the blind degree of the object and summing a color value of the shadow to the calculated area in a unit of pixel. Accordingly, penumbra concentration of the penumbra area, that is, characteristics of the penumbra that as the penumbra is close to the umbra, the penumbra is dark, and as penumbra is apart from the umbra, the penumbra is bright may be represented.

However, the PCSS method described above has a disadvantage that an additional amount of computation for calculating a sampling area is required, and has a disadvantage that an amount of used memory is increased even if a pre-stored lookup table is used to avoid the additional amount of computation. In addition, the PCSS method also has a disadvantage that an additional amount of computation for summing test values for the calculated shadow area is required, and it is impossible to apply the PCSS method to a 2D framework that does not support pixel rendering, or the like.

Hereinafter, exemplary embodiments will be described in detail with reference to the accompanying drawings.

Figure 1:
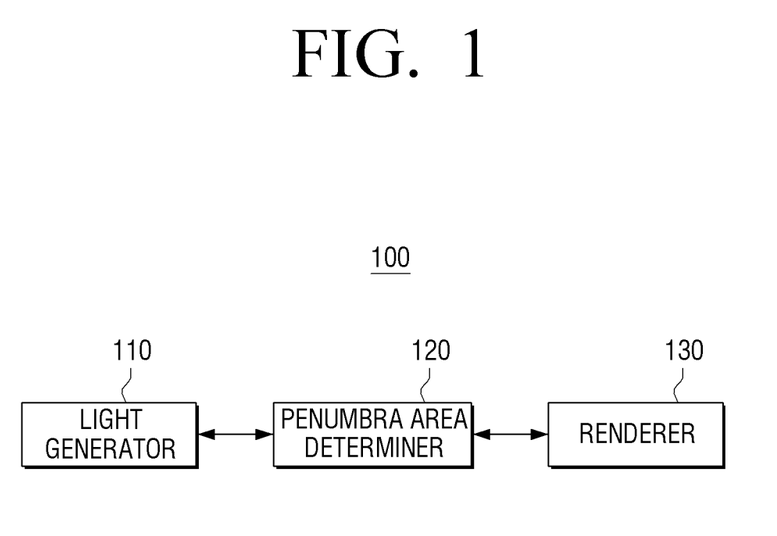
FIG. 1 is a block diagram briefly illustrating a configuration of a shadow rendering apparatus according to an exemplary embodiment.

FIG. 1 is a block diagram briefly illustrating a configuration of a shadow rendering apparatus according to an exemplary embodiment.

A shadow rendering apparatus 100 may be implemented in various kinds of electronic devices that may process an image such as a TV, a smart phone, a portable terminal, a computer, a notebook computer, a tablet PC, and the like.

Referring to FIG. 1, the shadow rendering apparatus 100 according to an exemplary embodiment includes a light generator 110, a penumbra area determiner 120, and a renderer 130. The penumbra area determiner 120 and the renderer 130 may each be implemented by one or more central processing units (CPUs).

In order to represent objects which are three-dimensionally modeled in graphics, three-dimensional objects may be formed in a collection of a triangular polygons. 3D graphics are implemented using information of these polygons. Here, as a structure storing information of the three-dimensional objects, a vertex and texture may be used.

The light generator 110 is a configuration emitting radial light to the object so that the shadow area for the object generated by the three-dimensional modeling is projected. Here, the shadow area means an area in which the radial light is blocked by the object and does not arrive, and may include an umbra area and a penumbra area.

Figure 2:
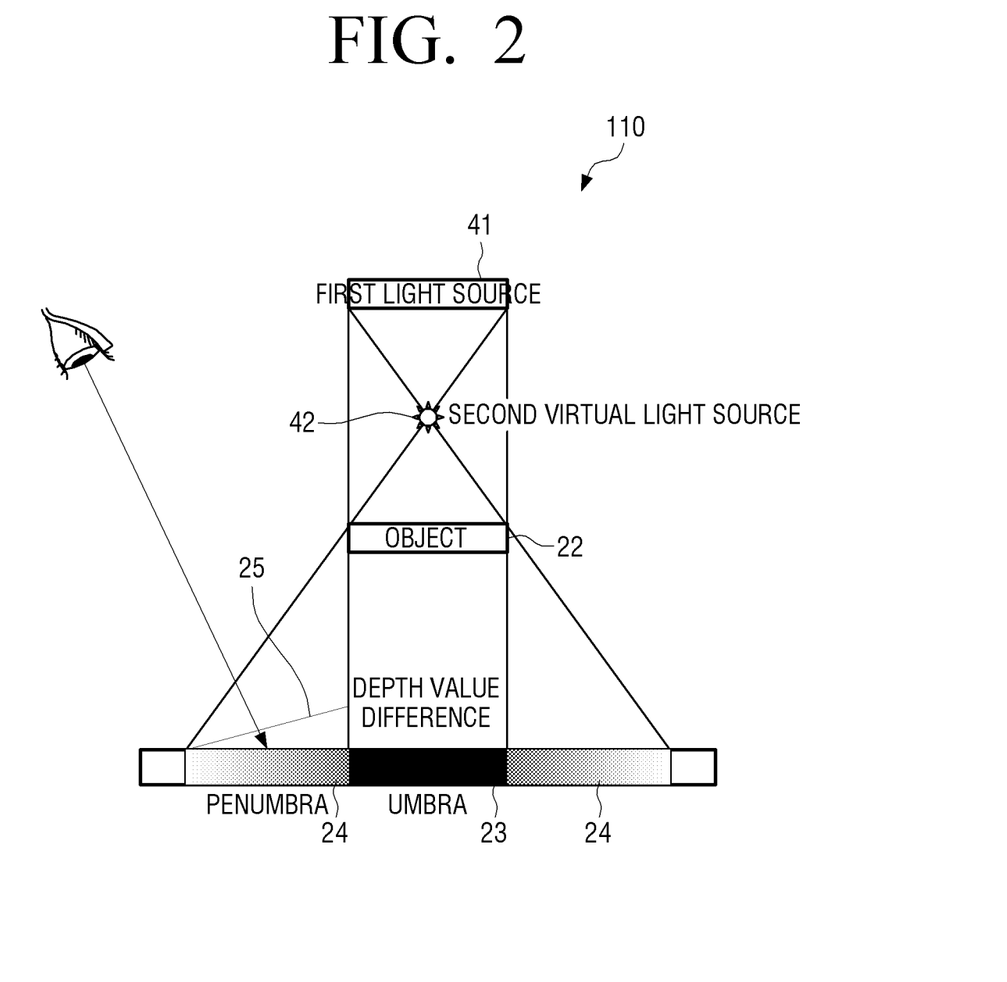
FIG. 2 is a diagram illustrating a method for calculating a penumbra area by additionally setting a light source, according to an exemplary embodiment.

As illustrated in FIG. 2, the light generator 110 is a configuration that implements a light source irradiating lux rays to the object 22. Here, the light source may be implemented in a point light source form disregarding a physical size, or may be implemented in a surface light source form. That is, the light generator 110 may form an environment allowing a shadow of the object 22 to be formed by irradiating rays emitted from the light source to the object 22. A distance that the light source generated by the light generator 110 is spaced apart from the object 22 is not particularly limited in the present specification, but may be flexibly set by taking account of a physical law that brightness of the light source is inversely proportional to a square of the spaced distance.

The light generator 110 may additionally generate a second light source 42 for generating the penumbra of the object 22 independent of the first light source 41, in addition to the first light source 41 for generating the umbra for the object 22. Here, the second light source 42 which is additionally generated may be implemented in at least one surface light source or point light source of which rays are spread in a radial type, and a position thereof may also be variously adjusted. For example, if the distance between the first light source 41 and the object 22 is decreased, the position of the second light source 42 may move up, and if the distance between the first light source 41 and the object 22 is increased, the position of the second light source 42 may move down. However, it is advantageous that the second light source 42 is positioned between the first light source 41 and the object 22.

Particularly, the second light source 42 may radiate light by adjusting a radiation angle so that the overall object 22 is included in the radiated light. That is, the light generator 110 may independently calculate the shadow areas by the first light source 41 and the second light source 42 by additionally setting the second light source 42 that may project a wider area.

The penumbra area determiner 120 is a configuration that determines a portion of the shadow area as the penumbra area 24 for the object 22. Specifically, the penumbra area determiner 120 may calculate depth information on the object 22 in relation to the light source 42 that emits the radial light, and may determine the penumbra area 24 for the object 22 based on a first depth map generated according to the depth information.

That is, the penumbra area determiner 120 may additionally generate depth map for the object 22 of the second light source 42, in addition to the depth map for the object 22 of the first light source 41. Hereinafter, the depth map for the object 22 of the first light source 41 is referred to as a first depth map, and the depth map for the object 22 of the second light source 42 is referred to as a second depth map.

The penumbra area determiner 120 may determine a shadow area in which light radiated by the first light source 41 is blocked and a shadow area in which light radiated by the second light source 42 is blocked, respectively, based on information of the first depth map and the second depth map. The penumbra area determiner 120 may determine the umbra area 23 by classifying the shadow areas generated by the respective light sources, and may determine the remaining area except for the umbra area 23 among the shadow areas as the penumbra area 24. Accordingly, since the shadow areas may be calculated only by testing two depth maps, the number of computation times may be significantly reduced.

In order to calculate the shadow area by the second light source 42, a computation that modifies an existing projection matrix is used. Since this computation is a computation included in a basic graphics rendering pipeline, it has higher computation performance than other computations. Therefore, it is possible to calculate the shadow area at very high efficiency as compared to a sampling method.

The renderer 130 is a configuration that renders the penumbra for the object 22 to the determined penumbra area 24. Specifically, the renderer 130 that performs a rendering process for the shadows projected from the first light source 41 and the second light source 42, serves to project the shadow on the virtual plane and implement the projected shadow as a shadow image.

The renderer 130 may determine a shading value of the penumbra area 14 determined based on a depth value difference between the first depth map and the second depth map, and may render the penumbra for the object 22 to the penumbra area 24 according to the determined shading value. That is, the renderer 130 may allow a darkness degree of the shadow image implemented according to density of the shadow projected on the virtual plane to be different, in the rendering process. Thereby, it is possible to implement a shadow image having excellent texture. Here, as illustrated in FIG. 2, darkness of the shading of the penumbra may be increased as the penumbra is close to the umbra 23 such as a gradient of a line 25, and may be linearly implemented as the penumbra is away from the umbra 23.

Figure 5:
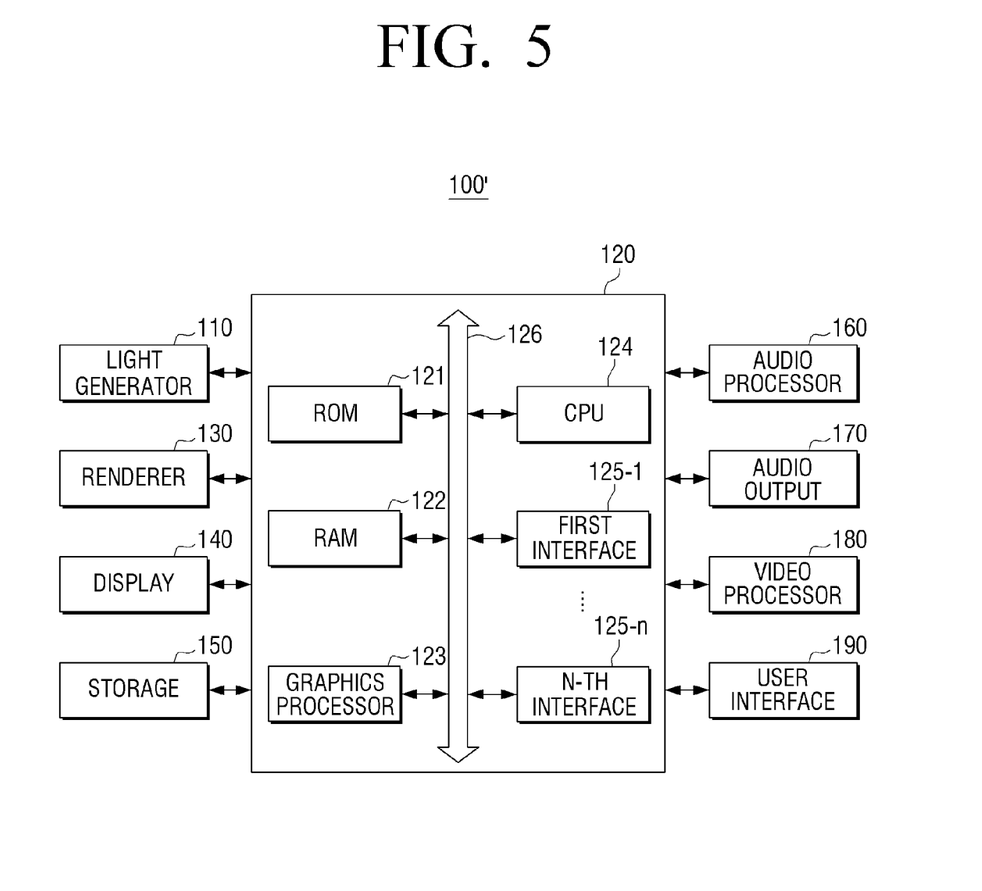
FIG. 5 is a block diagram specifically illustrating a configuration of a shadow rendering apparatus according to another exemplary embodiment.
Figure 6:
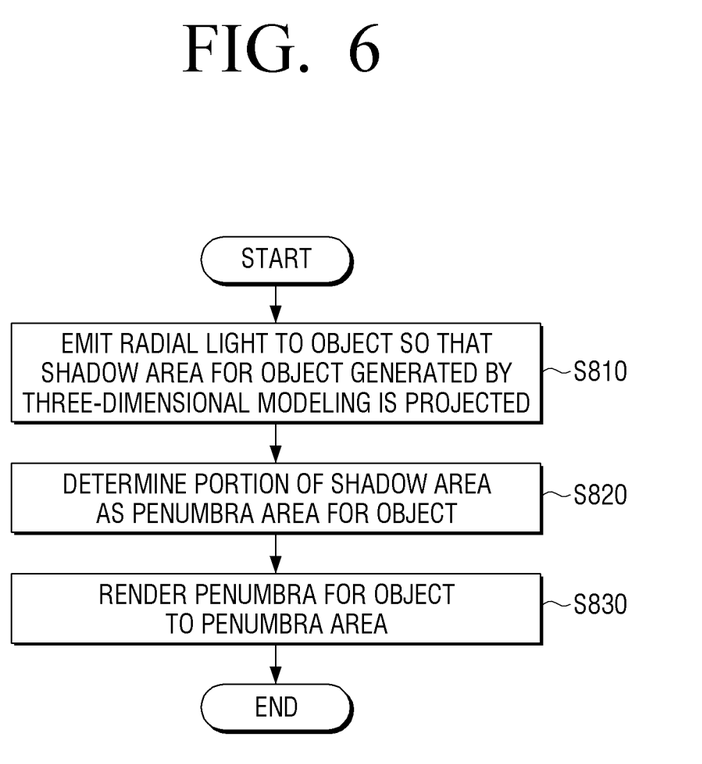
FIG. 6 is a flowchart illustrating a shadow rendering method according to an exemplary embodiment.

FIGS. 5 and 6 are diagrams illustrating a method for rendering a penumbra in a unit of object, according to an exemplary embodiment.

Figure 3:
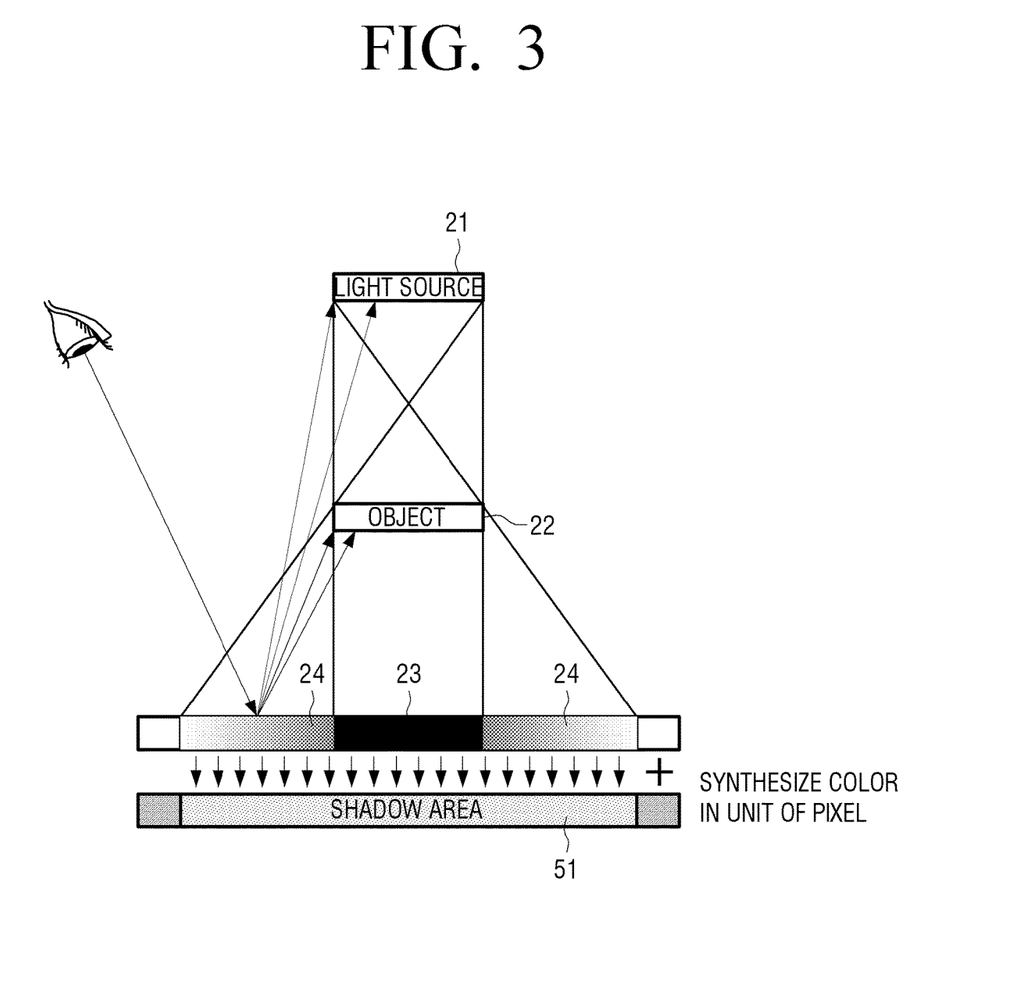
FIGS. 3 and 4 are diagrams illustrating a method for rendering a penumbra in a unit of object, according to an exemplary embodiment.

As illustrated in FIG. 3, in the related art, if the penumbra area 24 is calculated, the darkness degree is rendered by summing a color value of the object 22 in a unit of pixel to the penumbra area 24. That is, the related art PCSS represents brightness of the penumbra to be different from each other depending on a position of the penumbra area 24 by rendering all pixels viewed by a line of sight of a user in the shadow area 51 to color values corresponding to the umbra area 23 and the penumbra area 24, respectively.

However, since the method for summing the color values per the pixel of the shadow area 51 described above needs to perform a color summation computation as many as the number of pixels, there is a disadvantage that a large amount of computation is required.

Figure 4:
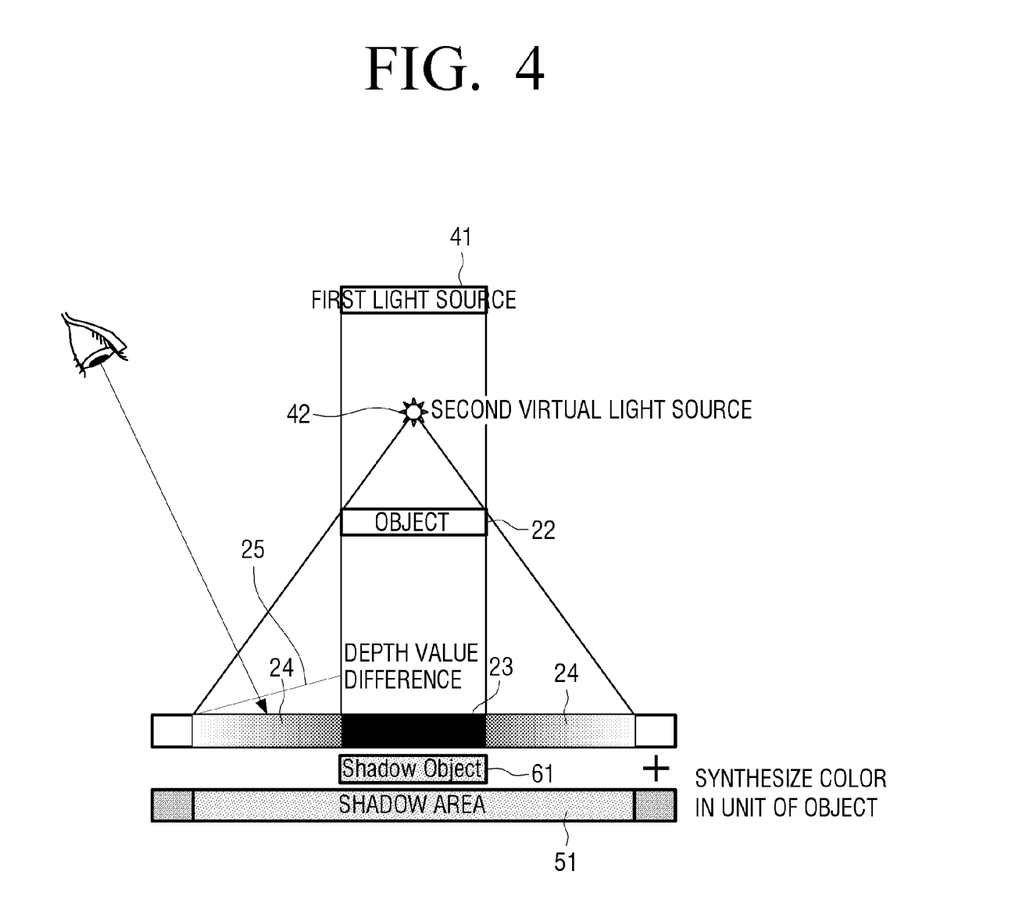

FIG. 4 illustrates a method for rendering a penumbra in a unit of object according to an exemplary embodiment, instead of the method for rendering the penumbra in a unit of pixel according to the related art. As illustrated in FIG. 4, the renderer 130 may generate a shadow object 61 by converting the object 22 into a gray scale, and may render the penumbra for the object 22 by synthesizing the shadow object 61 in a unit of shadow object 61 in the calculated shadow area 51. Here, the renderer 130 may generate the shadow object 61 by converting the object 22 into the gray scale and performing a blur filtering.

Specifically, the renderer 130 may render the penumbra by a 2D projection of the shadow object 61 by synthesizing the shadow object 61 while sequentially moving the shadow object 61 by an interval in a unit of shadow object 61. Here, if the position of the second light source 42 is sequentially moved by the interval, the shadow object 61 is overlapped with the shadow area 51, thereby making it possible to rapidly render the shadow area 51. The interval may be preset.

In addition, according to a method for rendering a shadow based on an object according to the present disclosure, the shadow may be generated by a 2D object rendering computation even in an existing 2D framework that does not support the pixel rendering. Specifically, since a general UI framework supports a layer rendering of a basic primitive, a shadow effect may be rendered by utilizing the above-mentioned computation without utilizing a 3D graphics library. The shadow rendering computation based on the object may have higher efficiency in the shadow rendering of the text and primitive supported by the UI framework.

FIG. 5 is a block diagram specifically illustrating a configuration of a shadow rendering apparatus according to another exemplary embodiment e. As illustrated in FIG. 5, a shadow rendering apparatus 100' according to another exemplary embodiment includes the light generator 110, the penumbra area determiner 120, the renderer 130, a display 140, a storage 150, an audio processor 160, an audio output 170, a video processor 180, and a user interface 190. Hereinafter, a description of portions overlapped with the description in FIG. 1 will be omitted.

The penumbra area determiner 120 controls an overall operation of the shadow rendering apparatus 100' using a variety of programs stored in the storage 150.

The penumbra area determiner 120 includes a read only memory (ROM) 121, a random access memory (RAM) 122, a graphics processor 123, a central processing unit (CPU) 124, first to n-th interfaces 125-1 to 125-n, and a bus 126, as illustrated in FIG. 5. Here, the ROM 121, the RAM 122, the graphics processor 123, the CPU 124, the first to n-th interfaces 125-1 to 125-n, and the like may be connected to each other via the bus 126. However, a configuration of the penumbra area determiner 120 is not limited thereto, and the penumbra area determiner 120 may include various apparatuses capable of performing the same function as or similar function to the ROM 121, the RAM 122, the graphics processor 123, and the CPU 124.

The ROM 121 stores a set of instructions for booting a system, and the like. The CPU 124 copies a variety of application programs stored in the storage 150 in the RAM 122 and executes the application programs copied in the RAM 122 to perform a variety of operations.

The graphics processor 123 generates a screen including various objects such as an icon, an image, a text, and the like using a computer (not illustrated) and a renderer (not illustrated). The computer computes attribute values such as coordinate values, shapes, sizes, colors, and the like in which the respective objects are to be displayed according to a layout of the screen. The renderer of the graphics processor 123 generates the screen of various layouts including the objects based on the attribute values computed by the computer.

The CPU 120 accesses the storage 150 and performs a booting operation using an operating system (O/S) stored in the storage 150. In addition, the CPU 120 performs various operations using a variety of programs, contents, data, and the like stored in the storage 150.

The first to n-th interfaces 125-1 to 125-n are connected to the variety of components described above. One of the interfaces may be a network interface connected to an external device through a network.

The display 140 may provide various contents screens. Here, the contents screens may include various contents such as an image, a moving image, a game, text, and the like, an application execution screen including the various contents, a graphic user interface (GUI) screen, and the like. An implementation scheme of the display 140 is not limited thereto. For example, the display 140 may be implemented in various forms of displays such as a liquid crystal display (LCD), an organic light emitting diodes (OLED) display, an active-matrix organic light-emitting diode (AM-OLED), a plasma display panel (PDP), and the like.

The storage 150 is a configuration that stores various modules for driving the shadow rendering apparatus 100'. Particularly, the storage 150 stores various data such as an operating system (O/S) software module for driving the shadow rendering apparatus 100' and a variety of multimedia contents.

Specifically, the storage 150 may store a base module processing signals transmitted from the respective hardware included in the shadow rendering apparatus 100', a storage module managing a database (DB) or a registry, a graphics processing module for generating a screen of a layout, a security module, and the like. Particularly, the storage 150 may store programs such as a light generating module for generating a virtual light source, a shadow rendering module for rendering a shadow, and the like according to exemplary embodiments.

The audio processor 160 is a component that performs the processing for audio data. The audio processor 160 may perform various processes such as decoding, amplification, noise filtration, etc. for the audio data.

The audio output 170, which is a configuration outputting audio, may be implemented as a speaker, headphones and the like.

The video processor 180 may perform various image processes such as decoding, scaling, noise filtration, frame rate conversion, resolution conversion, etc. for the contents.

The user interface 190 is a configuration for sensing a user interaction for controlling an overall operation of the shadow rendering apparatus 100'. Particularly, the user interface 190 may include various interaction sensing apparatuses such as a microphone (not illustrated), an infrared signal receiver (not illustrated), a touch screen and the like.

FIG. 6 is a flowchart illustrating a shadow rendering method according to an exemplary embodiment.

First, radial light is emitted to an object so that a shadow area for the object generated by a three-dimensional modeling is projected (S810). Here, the shadow area means an area in which the radial light is blocked by the object and does not arrive.

A portion of the shadow area is determined as a penumbra area for the object (S820). First depth information on the object may be calculated in relation to a light source that emits the radial light, and the penumbra area for the object may be determined based on a first depth map generated according to the first depth information. In addition, second depth information on the object may be calculated in relation to another light source that emits non-radial light, a umbra area for the object may be determined based on a second depth map generated according to the second depth information, and the remaining area except for the umbra area among the shadow area may be determined as the penumbra area.

A penumbra for the object is rendered to the penumbra area (S830). A shading value of the penumbra area may be determined based on a depth value difference between the first depth map and the second depth map, and the penumbra for the object may be rendered to the penumbra area according to the determined shading value.

In addition, a shadow object may be generated by converting the object into a gray scale, and the penumbra for the object may be rendered by synthesizing the shadow object in a unit of shadow object in the shadow area. This rendering of the penumbra may be implemented by a method of synthesizing the shadow object in the shadow area while sequentially moving the shadow object by an interval in the unit of shadow object. The interval may be preset.

According to the diverse exemplary embodiments as described above, since an amount of computation of a process of rendering a shadow may be reduced, a soft shadow may be more rapidly rendered in real time.

The control method according to the diverse exemplary embodiments described above may be implemented in program and may be stored in various recording media. That is, computer programs processed by a variety of processors to execute the diverse control methods described above may also be used in a state in which they are stored in the recording medium.

As an example, a non-transitory computer readable medium having a program stored therein may be provided, wherein the program performs an operation of emitting radial light to an object so that a shadow area for the object generated by a three-dimensional modeling is projected; an operation of determining a portion of the shadow area as a penumbra area for the object; and an operation of rendering a penumbra for the object to the penumbra area.

The non-transitory computer readable medium does not mean a medium storing data for a short period such as a register, a cache, a memory, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

Hereinabove, although various exemplary embodiments of the present disclosure have been shown and described, it should be understood that the present disclosure is not limited to the disclosed exemplary embodiments and may be variously changed without departing from the spirit and the scope of the present disclosure. Therefore, the present disclosure should be construed as including all the changes, equivalents, and substitutions included in the spirit and scope of the present disclosure.

What is claimed is:

1. A method for rendering a shadow in an image including an object projected by a first light source, the method comprising:
   determining a portion of a shadow area as a penumbra area for the object;
   generating a first shadow object by converting the object into a gray scale;
   generating a second shadow object which is shifted from the first shadow object by a predetermined interval; and
   rendering a penumbra image in the penumbra area by overlapping the first shadow object and the second shadow object.

2. The method as claimed in claim 1, wherein the shadow area is an area in which light projected by the first light source is blocked by the object and does not arrive at the shadow area.

3. The method as claimed in claim 1, wherein the determining the portion of the shadow area as the penumbra area for the object comprises calculating depth information for the object in relation to a second light source that emits second light, and determining the penumbra area for the object based on a depth map generated according to the depth information for the object in relation to the second light source.

4. The shadow rendering method as claimed in claim 3, wherein the determining the portion of the shadow area as the penumbra area for the object comprises calculating depth information for the object in relation to the first light source, determining an umbra area for the object based on a depth map generated according to the depth information for the object in relation to the first light source, and determining a remaining area except for the umbra area among the shadow area as the penumbra area.

5. The shadow rendering method as claimed in claim 1, wherein the generating the first shadow object comprises performing a blur filtering on the object converted into the gray scale.

6. A shadow rendering apparatus for rendering a shadow in an image including an object projected by a first light source, the shadow rendering apparatus comprising:
   a light generator configured to generate the first light source emitting light to the object and obtains a shadow area for the object by a three-dimensional modeling;
   a penumbra area determiner configured to determine a portion of the shadow area as a penumbra area for the object; and
   a renderer configured to generate a first shadow object by converting the object into a gray scale, generate a second shadow object which is shifted from the first shadow object by a predetermined interval and render a penumbra image in the penumbra area by overlapping the first shadow object and the second shadow object.

7. The shadow rendering apparatus as claimed in claim 6, wherein the shadow area is an area in which a light projected by the first light source is blocked by the object and does not arrive at the shadow area.

8. The shadow rendering apparatus as claimed in claim 6, wherein the penumbra area determiner calculates depth information for the object in relation to a second light source that emits second light, and determines the penumbra area for the object based on a depth map generated according to the depth information for the object in relation to the second light source.

9. The shadow rendering apparatus as claimed in claim 8, wherein the penumbra area determiner calculates depth information for the object in relation to the first light source, determines an umbra area for the object based on a depth map generated according to the depth information for the object in relation to the first light source, and determines a remaining area except for the umbra area among the shadow area as the penumbra area.

10. The shadow rendering apparatus as claimed in claim 6, wherein the renderer generate the first shadow object by performing a blur filtering on the object converted into the gray scale.

11. A shadow rendering apparatus for rendering a shadow in an image including an object projected by a first light source, the shadow rendering apparatus comprising:
   a light generator comprising a first light source configured to generate light which generates a umbra area to an object, and a second light source configured to generate light which generates a penumbra area to the object;
   a penumbra area determiner configured to calculate first depth information for the object based on the light emitted from the first light source and second depth information for the object based on the light emitted from the second light source, and to determine first and second depth maps from the calculated first and second depth information, respectively, and to determine the penumbra area based on the first and second depth maps; and
   a renderer configured to generate a first shadow object by converting the object into a gray scale, generate a second shadow object which is shifted from the first shadow object by a predetermined interval and render a penumbra image in the penumbra area by overlapping the first shadow object and the second shadow object.

12. The shadow rendering apparatus as claimed in claim 11, wherein the penumbra area determiner is further configured determine an umbra area for the object based on the first depth map, and determine the penumbra area for the object based on the second depth map and a remaining area except for the umbra area.

13. The shadow rendering apparatus as claimed in claim 11, wherein the renderer generate the first shadow object by performing a blur filtering on the object converted into the gray scale.

* * * * *